June 6, 1972  F. HUND  3,667,913
CHROMIUM-DIOXIDE-CATALYST
Original Filed Aug. 15, 1967  6 Sheets-Sheet 1

FIG. 1

INVENTOR.
FRANZ HUND
BY: Burgers, Dinklage
and Sprung
Attorneys

United States Patent Office 3,667,913
Patented June 6, 1972

3,667,913
CHROMIUM-DIOXIDE-CATALYST
Franz Hund, Krefeld-Bockum, Germany, assignor to Farbenfabriken Bayer Aktiengesellschaft, Leverkusen, Germany
Continuation of application Ser. No. 660,690, Aug. 15, 1967. This application May 4, 1970, Ser. No. 33,148
Int. Cl. C01b 7/04
U.S. Cl. 23—219
6 Claims

ABSTRACT OF THE DISCLOSURE

Chromium-dioxide of rutile-type crystal-structure and modified chromium-dioxide containing oxides and/or fluorides of cations which have radii in the range between 0.46 and 0.91 A. can be used as catalysts with high and permanent activity to promote oxidation-processes such as oxidation of hydrogen-chloride to chlorine and water, conversion of sulfur-dioxide to sulfur-trioxide oxidation of carbon-monoxide to carbon-dioxide, oxidation of ammonia to nitric oxides, oxidation and oxychlorination of hydrocarbons, combustion of hydrogen or alcohols and the like. The chromium-dioxide or the modified chromium-dioxide can be used as such or together with carriers. Furthermore it is possible to combine the chromium-dioxide catalysts with other catalytically active materials.

---

This application is a continuation of application Ser. No. 660,690 filed Aug. 15, 1967 and now abandoned.

The present invention relates to the use of chromium dioxide and chromium dioxide mixed phases as oxidation catalysts.

Chromium dioxide and chromium dioxide mixed phases having a rutile or polyrutile structure are known to be ferromagnetic materials. The formation of magnetic chromium oxides upon heating chromium dioxide was observed by I. Shukoff (J. Russ. Ges. 41, pages 302–304 (1909). Thamer and coworkers describe the manufacture of relatively pure chromium dioxide by heating chromium trioxide under hydrothermal conditions at temperatures of 300–325° C. under superatmospheric pressure. The manufacture of chromium dioxide from chromium hydroxide is likewise known.

Ferromagnetic chromium dioxides having other metallic oxides incorporated in the crystal lattice as well as processes for their manufacture are described e.g. in U.S. Pats. Nos. 2,923,638, 3,304,988 and 3,022,186. U.S. Pat. No. 3,034,988 particularly emphasizes the outstanding usefulness of chromium oxides as ferromagnetic materials, e.g. in the manufacture of sound recording tapes.

In accordance with the present invention it has now been found that there can be used as oxidation catalysts chromium dioxide crystallizing in the rutile lattice and chromium dioxide mixed phases crystallizing in the rutile or polyrutile lattice, which contain up to 50% by weight, referred to $CrO_2$, of additional compounds consisting of bivalent metallic fluorides or mono-, bi- and trivalent metallic oxides and fluorides, or 5-valent and 6-valent metallic oxides or mixtures thereof or mixtures of bivalent metallic fluorides with mono-, bi- and trivalent metallic oxides with 4-valent metallic oxides, the cations of the aforesaid additional compounds having radii which range between 0.46 and 0.91 A. and the said additional compounds being present in quantities so that the radii of the sum of their cations to the sum of their anions is 1:2.

The known oxidation vapor or gas phase processes can in principle be carried out with the aforesaid catalysts. Chromium dioxide catalysts have been found to be particularly effective e.g. in the oxidation of hydrogen chloride with oxygen-containing gases. The conventional hydrogen chloride oxidation with copper chloride as catalyst (Deacon-Process) necessitates the application of temperatures of 500–600° C. and is thus conducted within a temperature range wherein the reaction equilibrium is rather detrimental. With the catalysts proposed according to the invention, the reaction can be carried out at temperatures between about 240–300° C. with high yields and at a satisfactory rate.

Similar good results are obtained e.g. in the oxidation of $SO_2$ to $SO_3$, in the oxidation of ammonia to nitric oxides, in the oxidation of hydrocarbons, in the combustion of hydrogen to water, of alcohols to aldehydes and ketones as well in the oxychlorination of organic compounds with hydrogen chloride and oxygen or oxygen-containing gases. The oxychlorination can be represented by the following equations:

In this connection reference is made to the publications by Y. Mayor in "Chemische Rundschau" of Apr. 1, 1965.

The chromium dioxides as oxidation catalysts can be used either as such or in form of oxidic or fluoridic solid solutions having a rutile or polyrutile structure with Li, Cu, Na, Mg, Zn, Mn, Fe, Co, Ni, Pd, Al, Ga, Ti, As, Sb, V, Nb, Ta, Rh, Sc, In, Ge, Pb, Te, Ru, Os, Ir, Sn, Zr, Hf, Bi, Mo, W and U. By oxidic or fluoridic mixed phases of chromium dioxide having a rutile or polyrutile structure with the above listed elements there are to be understood substances having a rutile structure and wherein this host lattice takes up oxidic or fluoridic compounds of the above listed elements in a solid solution as guest components. These oxidic or fluoridic guest components whose cationic radii should be between 0.46 and 0.91 A., should be present in quantities so that the ratio of the sum of all cations to the sum of all anions is 1:2.

The guest components may be present in an amount up to 50% by weight, referred to chromium dioxide. In most cases, however, considerably smaller amounts, viz. between about 0.01 and 10%, are used. It is feasible to incorporate individual oxides or fluorides, but also different oxides and fluorides and even oxides and fluorides simultaneously. Fluorides of bivalent metals can be incorporated in the chromium dioxide lattice separately or in mixture. Besides, mono-, bi- and trivalent metallic oxides and fluorides, 5 - valent and 6 - valent metallic oxides and mixtures of bivalent metallic fluorides with monovalent, bivalent and trivalent metallic oxides and fluorides, as well as 5-valent and 6-valent metallic oxides in admixture with 4-valent metallic oxides can be used. The mixed phases can be produced by mixing chromic acid with the oxides or fluorides to be incorporated or with the compounds yielding oxides under manufacturing conditions, (e.g. carbonates, nitrates, hydroxides) under hydrothermal conditions at temperatures between 200 and 500° C., preferably 250 and 350° C., under a pressure of 100–300 atmospheres, preferably 150–250 atmospheres. It may be of advantage to replace, at least partially, the oxygen atmosphere in the production of catalysts by an inert gas. In order to produce a catalyst of predetermined particle size, it is often advantageous to perform the hydrothermal synthesis in several steps. In the first step there are produced relatively small particles of chromium dioxide or chromium dioxide mixed phases which are grown in further hydrothermal reaction steps under equal or under modified conditions with further amounts of chromic acid components and optionally with further guest components of the desired particle size.

It is also possible to produce an antimony oxide-modified chromium dioxide by heating $CrO_3$ with finely divided antimony or antimony compounds and water or lithium nitrate for 1 to 3 hours at temperatures of 250–400° C. under a pressure of 1–300 atmospheres or under atmospheric pressure. According to U.S. Patent No. 3,074,778 $CrO_2$ is obtained on fibrous $TiO_2$, boehmite, glass or $Al_2O_3$ by decomposing $CrO_2Cl_2$ at temperatures of 350–500° C. and pressures of 0.5–5.0 atmospheres gauge.

It has been found that the hydrothermal or pressureless synthesis of chromium dioxide or its heterotypical mixed phases can also be conducted together with substances which are suitable as catalyst supports and which are described below in particular: silica gels, silicic acid or surface-rich mixed phases with $SiO_2$-structures with, e.g. $SiO_2$, $AlPO_4$ and $BPO_4$ as hosts—F. Hund, Z. Anorg. Chemie 321, 1 (1963). The catalysts allow a throughput of between about 30 per about 150 l. of HCl gas per hour, referred to 1 l. of catalyst. The rate of throughput of 1 l. of HCl per hour and 1 l. of the contact material can be further considerably increased by depositing chromium dioxide or chromium dioxide mixed phases as HCl oxidation catalysts on supports which have a large surface area, e.g. $SiO_2$, and in particular by using the catalysts in a fluidized bed, and not in a stationary condition as before.

Other known processes can also be adopted in the production of chromium dioxide, e.g. the process described in Gmelins "Handbuch der anorg. Chemie," vol. 8, Verlag Chemie, Weinheim 1962, system No. 52, part B, pages 90 to 103.

As it is well-known from the technique of catalysts, chromium dioxide and its above described mixed phases can be applied as such in a more or less finely divided state. It is further possible to use these catalysts on a support material, e.g. aluminum oxide, pumice, diatomaceous earth, asbestos, kaolin, clay, zeolites, silica gel, SiC, $SiO_2$-gel, or together with one or more of another active component, e.g. $K_2SO_4$, $K_2S_2O_7$, $ZrO_2$, $ThO_2$ or $BaSO_4$. The catalysts can be applied on the support material either distributed in powder form or in granulated form. In the production of catalysts having an especially large surface, in particular on support materials, it may be of advantage to produce chromium dioxide from chromium hydroxide. Finally, it is possible to combine the catalysts having a chromium dioxide basis with other oxidation catalysts, e.g. $V_2O_5$, $MoO_3$, $Ag_2O$, $Al_2O_3$, $Sn(VO_3)_4$, vanadates of Bi, Sn, Fe, Ag, Mn, Zn, Pb, Ba, K, Al, V, Ni, $CoSO_4$, $B_2O_3$, $NaPO_3$, $K_2SO_5$, $V_2O_4$, $K_2S_2O_7$, $(NH_4)_3P(Mo_3O_{10})_4$, $(NH_4)_3P(W_3O_{10})_4$, $CeO_2$, $SnCl_2$, $CuCl_2$, $P_2O_5$, $SnO_2$, $TiO(VO_3)_2$, $ZrO_2$, $ThO_2$, $Ta_2O_5$, $UO_2$, CuO, NiO, CoO, $V_2O_3$, $WO_3$, $MgCr_2O_4$, $Fe_2O_3$, $Cr_2O_3$, $Mn/_2$, $PbMoO_4$, $CrO_3$, $FeMoO_4$, Hopcalit (60% $MnO_2$+40% CuO), Cu, Au, Pt, $H_3BO_3$, $H_3PO_4$, $AlPO_4$, Co, $CuCr_2O_4$, $UO_3$, $Cu_2O$, Se, Ce, W, Cr, Rh, $TeO_2$, Ir, $Bi_2O_3$, $CaCO_3$, rare earth oxides, $Co_3O_4$, $AgMnO_4$, $TiO_2$, ZnO, Pd, BaO.6 $Fe_2O_3$, BaO.2 $Fe_2O_3$, $VOSO_4$, $KVO_3$, $NaVO_3$, $Ba(VO_3)_2$, $Mg_2P_2O_7$, $TiO_2-V_2O_5$, alkali metal chloride+copper chloride+rare earth chloride, $FeCl_3$.

Thus, the catalysts to be used according to the invention can be extensively modified by appropriate choice of the guest components for chromium dioxide by varying the particle size, by admixing with other activating or inactivating substances, and by the choice of the support materials and can thus be adapted to the oxidation reaction in a given catalyst.

The following experiments are given only by way of example, the invention being limited only by the scope of the claims.

The invention will be better understood with reference to the accompanying drawing wherein.

EXAMPLE 1

Oxidation of hydrogen chloride with oxygen. The reaction can be represented by the following equation:

$$4HCl + O_2 \rightarrow 2Cl_2 + 2H_2O$$

The oxidation is carried out in an equipment as shown in the accompanying FIG. 1 as follows:

HCl gas streams from a steel cylinder 1 via a needle valve 2 past a safety valve 3 into a calibrated and analytically checked HCl rotameter 4a. Compressed air from a reducing means flows past the safety valve 3 into the calibrated air rotameter 4a and is combined with the aforesaid HCl gas stream via a T-member. The non-preheated mixed gases pass from the top into a hard glass tube 5 containing the catalyst; the hard glass tube (800 mm. length and 44 mm. outside diameter) is arranged in the center of the 500 mm. long electrical furnace.

250 ml. of the granulated contact material (grain diameter 0.2–2.0 mm.) are applied by means of a perforated hard glass plate to form a temperature-constant layer of about 200 ml. length symmetrically around the tube center. The temperature is read off by means of a protected Fe-constant-thermoelement 7 and kept constant at ±5° C. while measuring by means of tension and chopper bar control means. The initial and starting gases pass from the reaction tube through a three-way tap 8 either via the gas washing bottle 11 into the outlet or into two absorption washing bottles 9 which are equipped with glass frits 10 (analytical absorption system). A 1.862 N-sodium hydroxide solution having a concentration of 1.075 g./ml. is used as absorption liquid.

Because of their large number the experiments were carried out without means adapted to automatically keep the flow velocity constant and without correcting the volume of the flow gases as to atmospheric pressure and temperature conditions. Besides, the gas mixture entering the contact material was not preheated; this can possibly give rise to a somewhat lower reaction temperature than the temperature measured on the thermoelement.

At a constant HCl-air volume ratio of about 1:4, the $Cl_2$ yields were analytically determined by the aforesaid analytical absorption for the three flow velocities of 32, 64 and 100 l. of HCl per hour and per 1 l. of contact material. The tests were carried out each at rising and decreasing working temperatures, with on an average, at least three repeated absorption analyses for each measuring point after the addition of potassium iodide. The following preparations were used as catalysts in the experiments:

(1) An undoped chromium dioxide preparation as nucleus. The sample is prepared by intimately mixing 1190 g. of $CrO_3$ and 20 ml. of $H_2O$. The mixture is heated to 280° C. over $H_2O$ in a steel container in a high-grade steel autoclave of 2 l. capacity, a pressure of 200 atmospheres is set up and the pressure and temperature are maintained for 30 minutes to 8 hours. After cooling the preparation is pulverized, washed with distilled $H_2O$ until free of chromium filtered and dried at 105° C. Yield: 852 g. of undoped chromium oxide.

(2) An undoped chromium dioxide preparation as pigment. This sample is prepared by mixing 80 g. of the undoped chromium dioxide nucleus as described in (1) with 1190 g. of $CrO_3$ and 160 ml. of $H_2O$.

The mixture is heated to 300° C. as described in (1) in a steel container and steel autoclave, a pressure of 270 atmospheres is set up and the temperature and pressure are kept for 30 minutes to 8 hours. Working up is the same as described in (1). Yield: 1016 g. of an undoped chromium pigment.

(3) $Sb_2O_3$-doped chromium dioxide as nucleus. The sample is prepared by mixing 1190 g. of $CrO_3$ with 80 g. of $Sb_2O_3$, $Sb_2O_4$, Sb or $Sc_2O_5$ and 20 ml. of $H_2O$ and the mixture is further processed as described in (1) 1063 g. of a chromium dioxide nucleus doped with antimony is thus obtained.

(4) An $Sb_2O_3$-doped chromium dioxide preparation as pigment. This sample is prepared by mixing 1190 g. of $CrO_3$ with 80 g. of an antimony-doped chromium dioxide nucleus prepared as described in (3) as well as 160 ml. of $H_2O$. Further processing is the same as described in (2). 1045 g. of an antimony-doped chromium dioxide pigment are obtained.

(5) A $TeO_2$-doped chromium preparation as nucleus. This sample is prepared by mixing 892.5 g. of $CrO_3$ with 60 g. of $TeO_2$, $TeO_3$, Te or telluric acid and 15 ml. of $H_2O$ and further processing this mixture as described in (1). About 800 g. of a tellurium-doped chromium dioxide nucleus are thus obtained.

(6) A $TeO_2$-doped chromium dioxide preparation as pigment. This sample is prepared by mixing 892.5 g. of $CrO_3$ and 60 g. of the tellurium-containing chromium dioxide nucleus prepared as described in (5) as well as 120 ml. of $H_2O$ and further processing as described in (2). About 800 g. of a tellurium-doped chromium dioxide pigment are thus obtained.

The catalytical efficiency of the aforesaid substances is shown in the accompanying diagrammatic drawings, FIGS. 2–10. The uppermost line of the drawings indicates the position of equilibrium at the respective temperature, i.e. the theoretical yield in dependence on the temperature.

Figure 2:
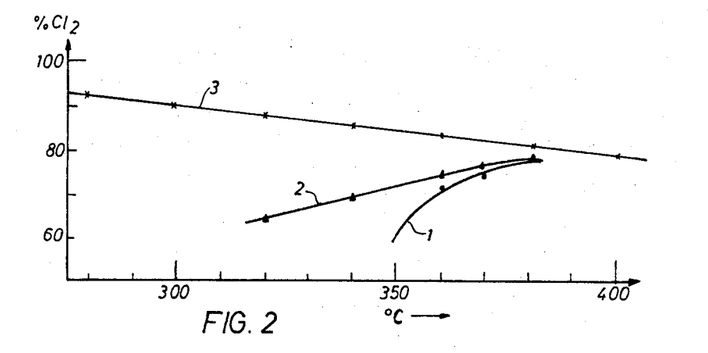
FIGS. 2 through 13 both inclusive, are plots indicating various comparative data for the catalyst of this invention.
Figure 3:
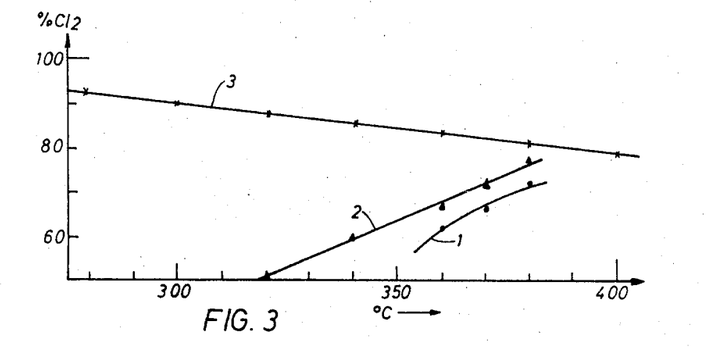
Figure 4:
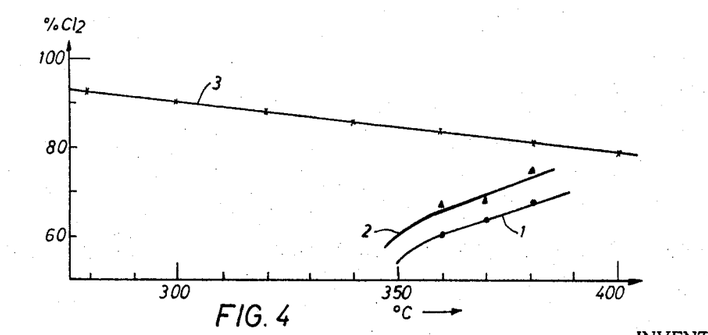

FIGS. 2, 3 and 4 indicate the yield of chlorine in percent in dependence on the temperature for the catalysts 1 and 2. Curve 1 corresponds to catalyst 1, curve 2 corresponds to catalyst 2 and curve 3 corresponds to theoretical yield. FIG. 2 relates to the throughput velocity of 64 l. per hour and FIG. 4 to the throughput velocity of 100 l. per hour.

Figure 5:
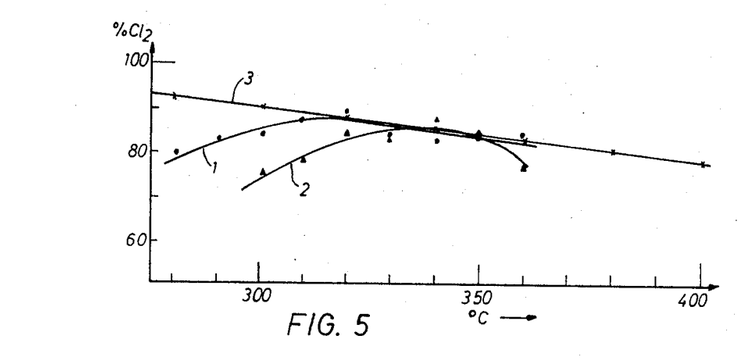
Figure 6:
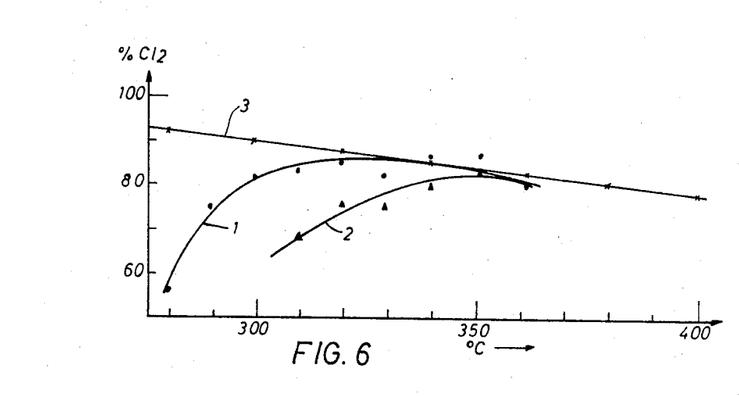
Figure 7:
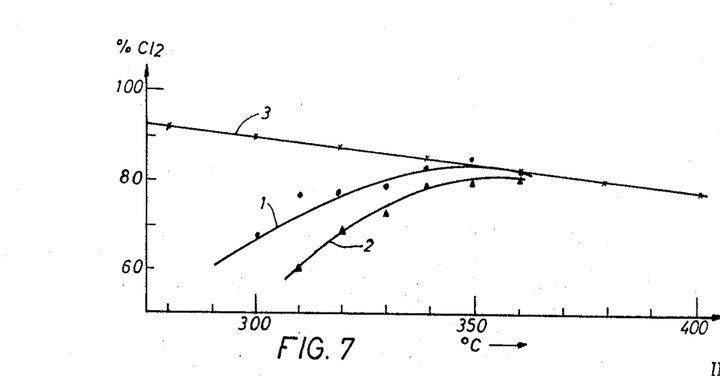

FIGS. 5, 6 and 7 illustrate the efficiency of the catalysts 3 and 4 for the same three throughput velocities. Curve 1 corresponds to catalyst 3, curve 2 to the catalyst 4, curve 3 indicates the theoretical value.

Figure 8:
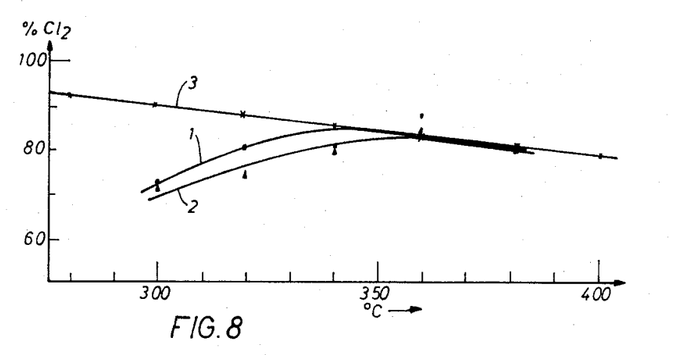
Figure 9:
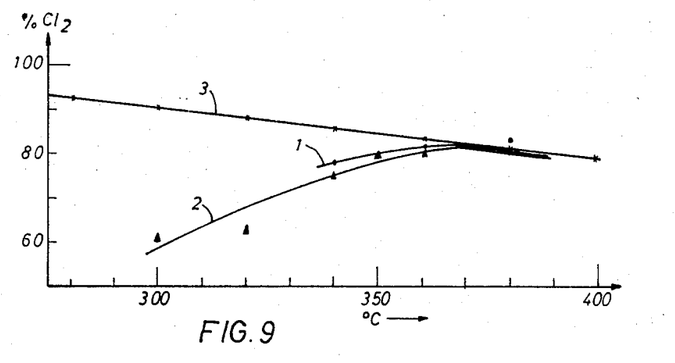
Figure 10:
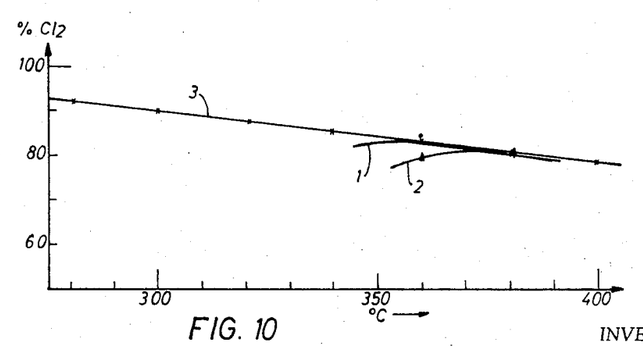

FIGS. 8, 9 and 10 illustrate the efficiency of the catalysts 5 and 6 for the same throughput velocity. Curve 1 corresponds to catalyst 5, curve 2 corresponds to catalyst 6, curve 3 indicates the theoretical value.

As can be seen from FIG. 2, the determined $Cl_2$ yields attain the theoretical yield at 380–390° C.

As can be seen from FIGS. 5, 6 and 7, very high yields are obtained even at temperatures of 290–300° C. According to FIG. 8, conversions of 80% and more are practically obtained at 320–350° C.

Chromium dioxide doped with $Sb_2O_3$ can also be obtained under atmospheric pressure: 300 g. of $CrO_3+20$ g. of $Sb_2O_3$ are intimately mixed and the mixture is heated to 300° C. for 3 hours in a porcelain dish in the atmosphere. After cooling further processing follows as described in (1). There are obtained 267 g. of a highly ferromagnetic antimony-containing chromium dioxide which consists of the rutile lattice of chromium dioxide as determined by X-ray photographs and magnetic measurements.

EXAMPLE 2

Figure 1:
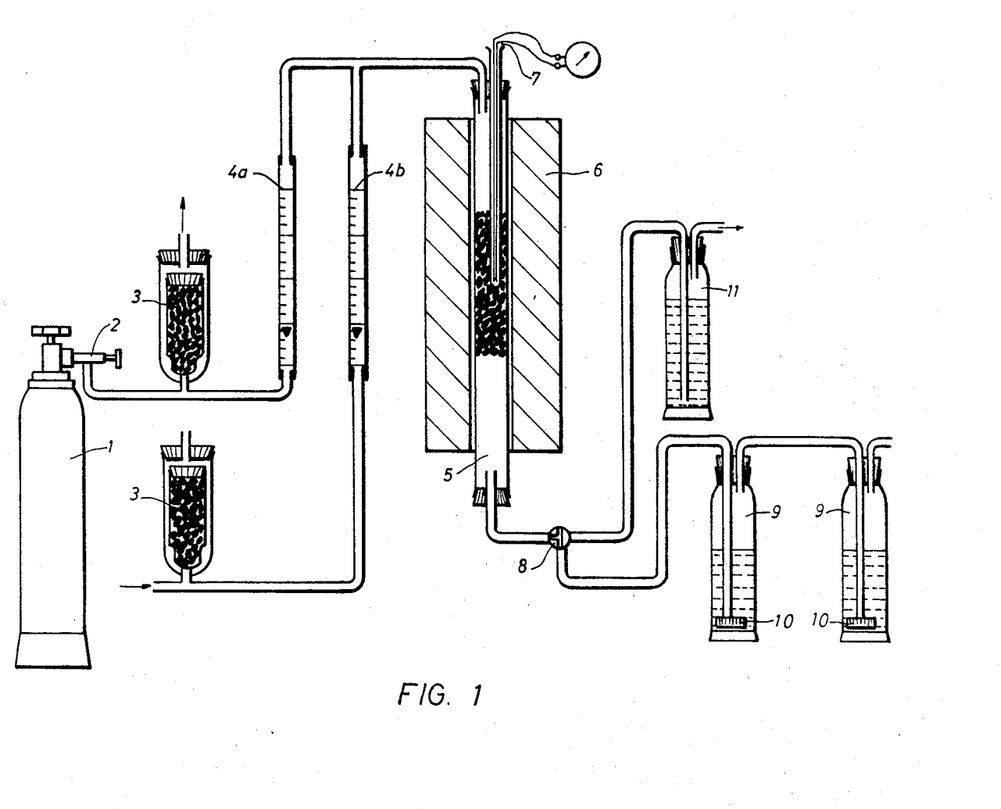
FIG. 1 is a schematic flow diagram of an oxidation process according to this invention.

An antimony-doped pigment is used as catalyst in the equipment shown in FIG. 1 at a working temperature of 340° C., for 600 hours in the oxidation of hydrogen chloride with oxygen. With 64 l. of HCl per hour and 1 l. of contact material, a yield of 76.4±0.4% is determined in continuous quantitative analyses at an interval of 12 hours each. The life period of chromium dioxide or chromium dioxide mixed phases having a rutile structure is very long for the catalytical HCl oxidation of oxygen. The efficiency of the catalysts is not diminished even after operation for 600 hours.

The antimony-doped chromium dioxide on an $SiO_2$-support is prepared as follows: 288 g. of $CrO_3$ are dissolved in $H_2O$ and mixed with 16 g. of $Sb_2O_3$ and 300 g. each of silica gels or silica gel balls having different pore sizes and the mixture is evaporated to dryness on the water bath. After cooling the dry mixture is pulverized and heated to 280° C. in a steel autoclave. A pressure of 200 tmospheres is set up; further processing is the same as described in (1). 500–530 g. of a very finely divided, antimony-doped chromium dioxide catalyst which is deposited on silica gel is obtained.

EXAMPLE 3

Oxidation of $SO_2$ with oxygen. The reaction can be presented by the following equation:

$$2SO_2+O_2 \rightarrow 2SO_3$$

The reaction is carried out in the equipment shown in FIG. 1. $SO_2$ is used instead of HCl. 93% by volume of compressed air and 7% by volume of $SO_2$ are combined and stream into the catalyst furnace without being preheated. The reaction is measured at rising and decreasing temperature by means of an electrical roasting gas testing device —$SO_2$ testing device of Siemens und Halske AG.

Figure 11:
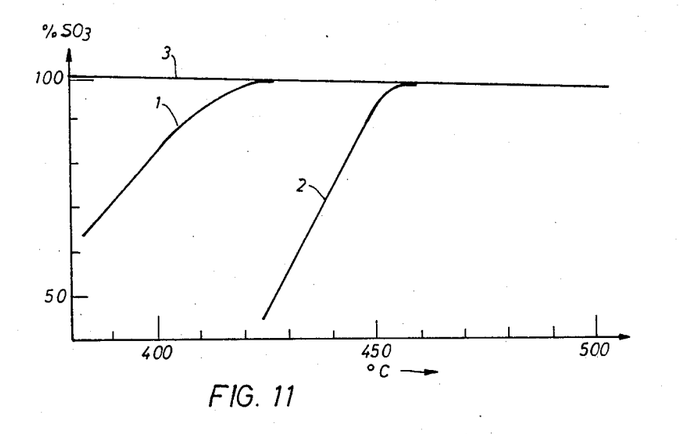
Figure 12:
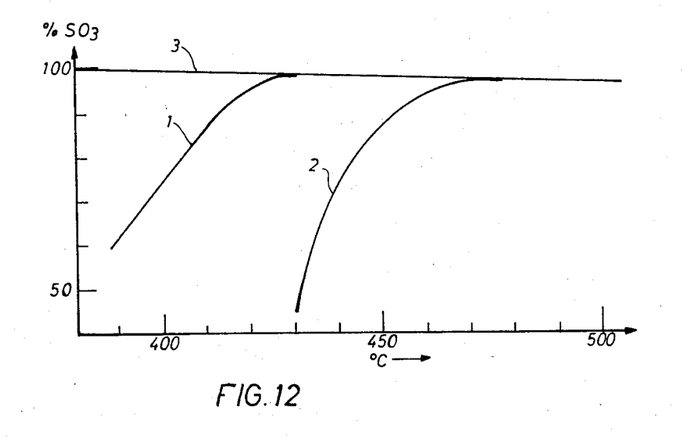

For comparison, there is used under the same conditions commercial vanadium pentoxide contact material (which is used in technical processes) applied onto an $SiO_2$-support. FIG. 11 indicates the temperature dependence of the $SO_3$ yield of the technical contact material, an antimony-doped chromium dioxide nucleus and the theory calculated for the working conditions chosen at a throughput velocity of 200 l. per hour per 1 l. of the contact material, and FIG. 12 indicates the same values for a throughput velocity of 400 l. per hour per 1 l. of the contact material. In FIGS. 11 and 12, curve 1 describes the catalyst to be used according to the invention, curve 2 indicates the efficiency of the vanadium pentoxide contact material, curve 3 describes the theoretically possible yield.

At a flow velocity of e.g. 400 l. of a gas mixture (28 l. $SO_2$) per hour and 1 l. of contact material the antimony-doped chromium dioxide nucleous attains as contact material the theoretical value of about 99% at 425° C., whereas the technical vanadium oxide contact material when employed under the same working conditions approximates the theoretical value of about 97.6% only at about 470° C.

EXAMPLE 4

The oxidation of carbon monoxide can be presented by the following equation:

$$2CO+O_2 \rightarrow 2CO_2$$

Figure 13:
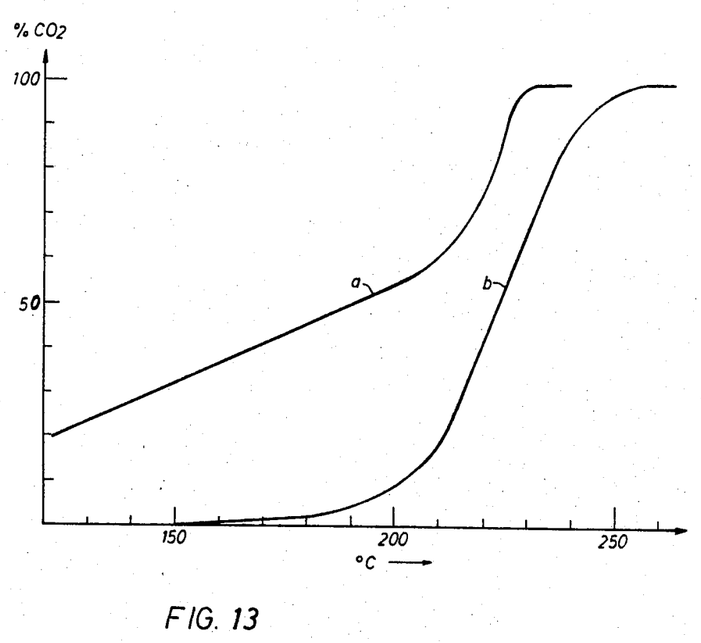

Chromium dioxide and chromium dioxide mixed phases are n-conductive oxides. The n-conductive oxidic catalysts used in the oxidation of carbon dioxide accelerate the reaction within a temperature range of 150–400° C. The equipment illustrated in FIG. 1 is used for measuring the catalytical efficiency of the chromium dioxide or antimony-doped chromium dioxide mixed phases catalysts. The results are given in FIG. 13 for an antimony-doped chromium dioxide nucleus. The theoretical conversions of the carbon monoxide oxidation carried out at the aforesaid low temperature are practically 100%. In the first experiment (curve b) using 64 l. Co and 160 l. air per hour and 1 l. of contact material, the reaction sets in at about 200° C. and attains a conversion of more than 99–8% at about 250° C.; in the second experiment (curve a) using 15 l. of Co and 385 l. of air per hour and 1 l. of contact material the reaction sets in at about 120° C. and attains the theoretical conversion of 100% at about 230° C. The analytical determination of carbon monoxide and carbon dioxide is accomplished by infrared measurement.

EXAMPLE 5

The total combustion of methanol with oxygen can proceed according to the following equation:

$$CH_3OH+3/2O_2 \rightarrow CO_2+2H_2O$$

An antimony-doped, granulated chromium dioxide pigment is introduced into the equipment illustrated in FIG. 1. 110 l. of air together with 11 g. of methanol or 52 l. of air together with 3.7 g. of methanol are passed within 1 hour over a 150 ml. of contact material and the temperature of the furnace is slowly raised. The entire quantity of methanol used is burnt to $CO_2$ already at 130° C.; $CO_2$ is gasometrically determined in an Orsad gas analyses apparatus.

EXAMPLE 6

The combustion of $NH_3$ with atmospheric oxygen can proceed according to various equations which are listed below:

$$4\ NH_3 + 5\ O_2 \rightarrow 4\ NO + 6\ H_2O$$

$$4\ NH_3 + 3\ O_2 \rightarrow 2\ N_2 + 6\ H_2O$$

$$4\ NH_3 + 4\ O_2 \rightarrow 2\ N_2O + 6\ H_2O$$

In the equipment shown in FIG. 1, $NH_3$ and air are contacted with one another at increasing temperatures over a tellurium-doped chromium dioxide pigment as catalyst. In an experiment using a gas mixture consisting of 75 l. of $NH_3$ and 925 l. of air per hour and 1 l. of contact material at about 360° C., $NH_3$ is converted into $HNO_3$ to about 41% and into $N_2O$ to about 54%. In another experiment using the same gas mixture and applying the same flow velocity, $NH_3$ is converted into $HNO_3$ at 280° C. to 35% and into $N_2O$ to 65%, $NO$ and $NO_2$ are titrated after oxidation in several washing bottles with NaOH as the $HNO_3$; $N_2O$ and $N_2$ are determined by mass spectrometry in the residual gas escaping from the absorption bottles.

I claim:

1. In the method of catalytically oxidizing hydrogen chloride with oxygen to form chlorine and water; the improvement which comprises catalyzing such oxidation by a catalyst selected from a group consisting of chromium dioxide having rutile structure and modified chromium dioxide having rutile or polyrutile structure and carrying out said oxidation at about 240 to 600° C.

2. Improvement according to claim 1, wherein said catalyst is provided on a carrier, said carrier forming a matrix containing said catalyst material in finely divided form.

3. Improvement according to claim 1, wherein said chromium-dioxide is modified with other ingredients which are present in an amount sufficient to improve the catalyst activity of said chromium-dioxide.

4. Improvement according to claim 1, wherein said modified chromium-dioxide contains as modifying components at least one member selected from the group consisting of oxides, fluorides, and mixtures thereof, the cations of said oxides and fluorides having radii of between about 0.46 and 0.91 A., said modifying component being present in an amount sufficient to improve the catalytic activity of the chromium-dioxide.

5. Improvement according to claim 4, wherein the modifying component is present in an amount of between about 0.01 to 10% based on said chromium dioxide.

6. The improved process claimed in claim 1, carried out at about 240 to 300° C.

References Cited
UNITED STATES PATENTS

| | | | |
|---|---|---|---|
| 2,418,309 | 4/1947 | Matuszak et al. | 252—467 |
| 2,451,870 | 10/1948 | Richardson et al. | 23—219 |
| 2,678,259 | 5/1954 | Banner et al. | 23—219 |
| 3,243,260 | 3/1966 | Kubota et al. | 23—145 |
| 3,371,043 | 2/1968 | Hund et al. | 23—145 |

OSCAR R. VERTIZ, Primary Examiner
G. O. PETERS, Assistant Examiner

U.S. Cl. X.R.
252—467

UNITED STATES PATENT OFFICE
CERTIFICATE OF CORRECTION

Patent No. 3,667,913           Dated June 6, 1972

Inventor(s) Franz Hund

It is certified that error appears in the above-identified patent and that said Letters Patent are hereby corrected as shown below:

Col. 1

Claims priority is missing from heading - should read:

"Germany, F 46 539, July 7, 1965".

Col. 1, line 49

"3,304,988" should be -- 3,034,988 --.

Col. 6, line 38

"nucleous" should be -- nucleu_ --.

Signed and sealed this 2nd day of January 1973.

(SEAL)
Attest:

EDWARD M. FLETCHER, JR.
Attesting Officer

ROBERT GOTTSCHALK
Commissioner of Patents